(12) United States Patent
Lucas et al.

(10) Patent No.: US 9,247,756 B2
(45) Date of Patent: Feb. 2, 2016

(54) DEVICE FOR SIMULTANEOUS CONSUMPTION OF A FLUID AND A FROZEN SUBSTANCE

(71) Applicant: LIQR POP, LLC, Newport Beach, CA (US)

(72) Inventors: Scott Lucas, Corona del Mar, CA (US); Tracy Reinhardt, Newport Beach, CA (US)

(73) Assignee: LIQR POP, LLC, Newport Beach, CA (US)

( * ) Notice: Subject to any disclaimer, the term of this patent is extended or adjusted under 35 U.S.C. 154(b) by 0 days.

(21) Appl. No.: 14/328,547

(22) Filed: Jul. 10, 2014

(65) Prior Publication Data

US 2015/0017300 A1 Jan. 15, 2015

Related U.S. Application Data

(60) Provisional application No. 61/844,982, filed on Jul. 11, 2013, provisional application No. 61/977,785, filed on Apr. 10, 2014.

(51) Int. Cl.
*A23G 9/22* (2006.01)
*A23G 9/08* (2006.01)
*A23G 9/28* (2006.01)

(52) U.S. Cl.
CPC ............. *A23G 9/221* (2013.01); *A23G 9/083* (2013.01); *A23G 9/22* (2013.01); *A23G 9/28* (2013.01)

(58) Field of Classification Search
CPC ......... A23G 3/563; A23G 3/50; A23G 9/221; A23G 9/44; A23G 9/503; A23G 9/083
USPC ......... 426/134, 515, 103, 393, 421, 284, 592; 249/63; 425/256
See application file for complete search history.

(56) References Cited

U.S. PATENT DOCUMENTS

| | | | |
|---|---|---|---|
| 4,229,482 A | 10/1980 | Kreske, Jr. | |
| 5,324,527 A | 6/1994 | Coleman | |
| 6,730,339 B2 | 5/2004 | Chan | |
| 8,092,847 B2 | 1/2012 | Chan | |
| 8,734,876 B2 | 5/2014 | French | |
| 2004/0037923 A1 | 2/2004 | Chan | |
| 2008/0102172 A1 | 5/2008 | Capelle et al. | |
| 2009/0211537 A1* | 8/2009 | Bertsch et al. | 119/707 |
| 2013/0156918 A1 | 6/2013 | Reinhardt et al. | |
| 2014/0065267 A1* | 3/2014 | Albano et al. | 426/90 |

* cited by examiner

*Primary Examiner* — James Sanders
*Assistant Examiner* — Leith S Shafi
(74) *Attorney, Agent, or Firm* — Knobbe Martens Olson & Bear LLP

(57) ABSTRACT

The present disclosure relates to a device for molding a freezable substance and dispensing a stored fluid substance. More specifically, the present disclosure relates to a device that, when assembled, creates a Popsicle®-like frozen confection having a container containing an alcoholic liquid, where the user employs a plunger to drive the alcoholic liquid upward through a lumen in the frozen confection so that the user may simultaneously consume the frozen confection and ingest the alcoholic liquid. The device is a four-piece assembly. The first member is a handle with a plunger disposed at one end. The second member is a flange and a container extending from the flange and receiving at a first end of the container the plunger, the container defining an inner volume to receive and store a fluid substance. The end of the container generally opposite the end receiving the plunger has an orifice. The third member interacts with the second member at the flange. Finally, the fourth member interacts with the orifice of the container.

20 Claims, 10 Drawing Sheets

DEVICE FOR SIMULTANEOUS CONSUMPTION OF A FLUID AND A FROZEN SUBSTANCE

RELATED APPLICATIONS

This application claims priority to U.S. Provisional Application No. 61/844,982 filed on Jul. 11, 2013, and to U.S. Provisional Application No. 61/977,785 filed on Apr. 10, 2014, both of which are hereby incorporated by reference in their entirety.

BACKGROUND

1. Field of the Invention

The present disclosure relates generally to a frozen confection or frozen beverage device. More specifically, the present disclosure relates to a device for forming a frozen confection that allows for simultaneous consumption of the frozen confection and a user-controlled quantity of fluid, such as alcohol.

2. Description of Related Art

People desire cool refreshments, especially during the hot summer months. Frozen confections, such as ice pops and Popsicles®, are well-known and popular summertime refreshments for people of all ages. A great variety of frozen confection products, having different colors, flavors, textures, fat content, and caloric content, are widely available. In addition to frozen confections, frozen cocktails are well-known and popular summertime refreshments enjoyed by adults. Frozen cocktails are popular in part because they are cold and also because they are alcoholic.

Freezing alcoholic beverages is problematic due to the low freezing point of ethyl alcohol (the alcohol in alcoholic beverages), which is approximately −173° F. under ambient conditions. The freezing point of alcoholic beverages is between the freezing points of water (32° F.) and alcohol (−173° F.), and depends on the beverage's alcohol content. Therefore, it is difficult to freeze alcoholic beverages and confections having higher alcohol content. As such, completely frozen confections such as ice pops and Popsicles® generally do not contain alcohol.

Because of the low freezing point of alcohol, popular frozen cocktails such as margaritas, piña coladas, and daiquiris are far from completely frozen when served. Instead, "frozen" cocktails are served as a slush with ice crystals suspended in the liquid. If the frozen cocktail is not quickly consumed, the ice crystals melt causing the cocktail to have a less desirable texture and temperature.

In addition to frozen cocktails, it is known to mix alcohol with gelatin to produce food products commonly referred to as Jello® shots and pudding shots. For instance, one type of product mixes vodka, or other alcoholic beverage, with a prepared gelatin before the gelatin solidifies or hardens. The gelatin is then chilled and hardens with the alcoholic beverage contained therein. Although these alcoholic gelatin products provide an alternative to frozen cocktails, they too are not completely frozen and therefore not as refreshing as completely frozen refreshments.

In view of the foregoing, there remains a need in the art for a device that allows for simultaneous consumption of the frozen confection and an alcoholic beverage. The present disclosure addresses this particular need, as discussed in detail below.

SUMMARY OF THE INVENTION

The present disclosure relates to a device for molding a freezable substance and dispensing a stored fluid. More specifically, the present disclosure relates to a device that, when assembled, creates a Popsicle®-like frozen confection having a container holding an alcoholic liquid. The user employs a plunger to drive the alcoholic liquid (or other consumable fluid or flowable substance that has a lower freezing point than that of the frozen confection) upward through one or more lumens or passageways in the frozen confection. Thus, the device allows for an alcoholic liquid and a frozen substance to be ingested simultaneously while being contained separately within a single vessel. The device further allows the user to control the amount of alcohol ingested, and thus the flavor of the product. Using the plunger, the user may shoot alcohol from the device, drizzle the alcohol over the frozen confection, or refrain from ingesting any alcohol at all.

In one embodiment, the device is a four-piece assembly. The first member is a handle with a plunger disposed at one end of the handle. The second member is a flange and a container extending from the flange and receiving at a first end of the container the plunger, the container defining an inner volume to receive and store a fluid substance (which preferably remains dispensable or flowable at temperatures below the freezing point of water). The end of the container generally opposite the end receiving the plunger has an orifice. The third member interacts with the second member at the flange. Finally, the fourth member interacts with the orifice of the container on one end. The fourth member can also interact with the third member. The second, third, and fourth members define a mold cavity for receiving a freezable substance (e.g., a water-based substance that freezes at or around the freezing point of water).

In another embodiment, the device permits molding a freezable substance so that the frozen substance has one or more lumens or pathways through which a fluid or flowable substance (preferably with a lower freezing point than that of the frozen substance) may pass or reside. This device comprises a hollow tubular or cup-like mold. In a preferred embodiment, the mold has an end open to receive a freezable substance and a closed opposing end. Disposed within the mold are one or more shafts, plugs, projections, or mandrels that extend inward from an inner surface of the mold to define the pathways in the frozen substance—for example, from the closed end of the mold toward the open end of the mold. The mold and the projections in some forms are unitary and in other forms are separable. Additionally, the mold can comprise a unitary body or can be formed of two or more pieces.

The present disclosure also relates to a method of forming a food item having a fluid portion and a molded portion comprised of a frozen substance. The fluid portion has a lower freezing point than that of the frozen substance. The method comprises providing a device having a mold cavity and a container. The mold cavity is filled with a freezable substance and sealed. The container is filled with the fluid portion and sealed. In this method, the mold cavity may have an elongated cylindrical shape. Further, the device may include a plunger that inserts into the container. Further, the container may be concentrically disposed within the mold cavity with the device is fully assembled.

DETAILED DESCRIPTION OF THE INVENTION

The present disclosure relates to a device for molding a freezable substance and dispensing a stored fluid substance. More specifically, the present disclosure relates to a device that, when assembled, creates a Popsicle®-like frozen confection having a container holding an alcoholic liquid. The user employs a plunger to drive the alcoholic liquid upward through a lumen in the frozen confection so that the user may simultaneously consume the frozen confection and ingest the alcoholic beverage. Thus, the device allows for an alcoholic liquid and a frozen substance to be ingested simultaneously while being contained separately within a single vessel. The device further allows the user to control the amount of alcohol ingested, and thus the flavor of the product. Using the plunger, the user may shoot alcohol from the device, drizzle the alcohol over the frozen confection, or refrain from ingesting any alcohol at all.

The drawings are for purposes of illustrating a preferred embodiment of the present disclosure, and not for purposes of limiting the same. Turning now to the drawings, as shown in FIGS. 1-10, there is provided a device 10 for preparing, storing, and serving a chilled item having an outer portion comprised of a freezable confection 12 and an inner portion comprised of a fluid 14, preferably an alcoholic beverage. In this regard, the device 10 is configured to allow a person to simultaneously consume a frozen confection 12 and a fluid 14.

Figure 1:
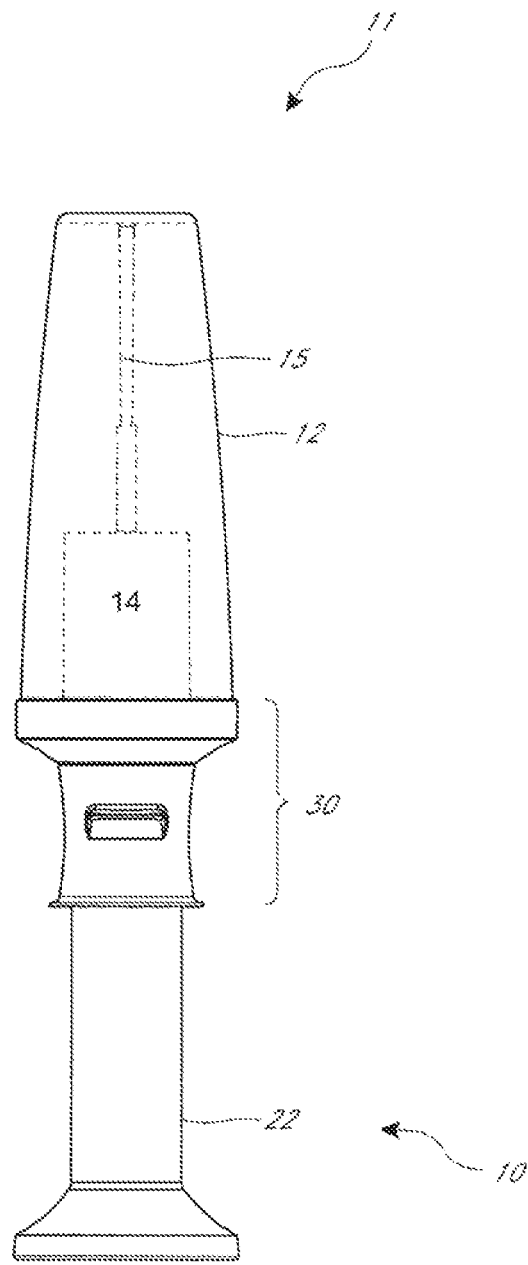
FIG. 1 depicts a side view of an exemplary device with the third member removed to expose the frozen confection, in accordance with exemplary embodiments of the invention.
Figure 8:
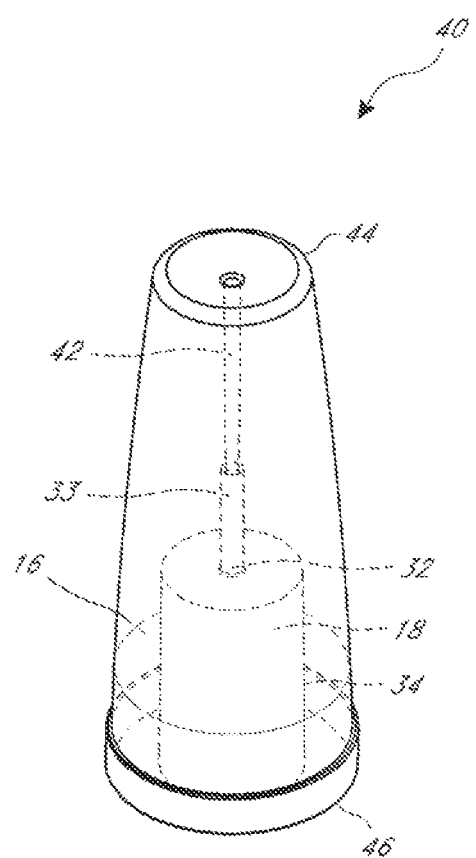
FIG. 8 depicts a side view of an exemplary third member and its internal structure, in accordance with exemplary embodiments of the invention.

More specifically, as shown in FIGS. 1 and 8, the device 10 includes a mold cavity 16 for receiving and storing the freezable confection 12, and an internal cavity 18 for receiving and storing the fluid 14. The device 10 allows the user to push upward on a handle 22 to displace the fluid 14 from an orifice 32 in the top of a container 34 and through a lumen 15 in the frozen confection 12 and out the top of the frozen confection 12. Thus, the mold cavity 16 and the internal cavity 18 are configured to allow a person to consume simultaneously the frozen confection 12 and the fluid 14. The design and operation of the device 10 is similar to the design and operation of a syringe.

Figure 3:
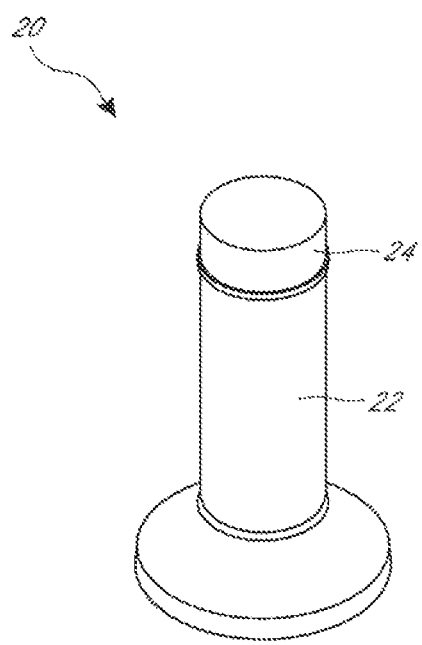
FIG. 3 depicts a top perspective side view of an exemplary first member, in accordance with exemplary embodiments of the invention.
Figure 5:
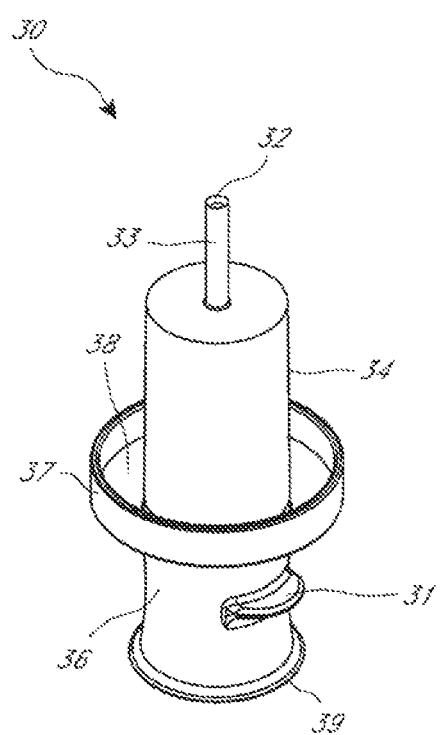
FIG. 5 depicts a side view of an exemplary second member, in accordance with exemplary embodiments of the invention.
Figure 7:
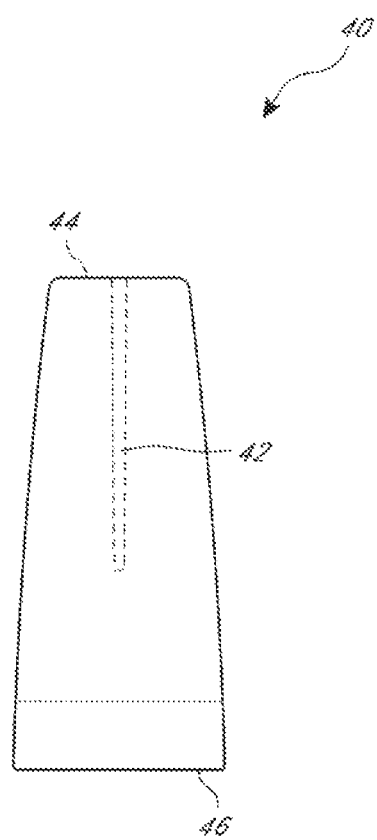
FIG. 7 depicts a side view of an exemplary third member, in accordance with exemplary embodiments of the invention.

In some embodiments, the device 10 may be comprised of four members. As shown in FIG. 3, a first member 20 is akin to the plunger of a syringe. The first member 20 is comprised of a handle 22 and a plunger 24 that is disposed at the end of the handle 22. As shown in FIGS. 3 and 5, a second member 30 (akin to the barrel of a syringe) includes a flange 36 and a container 34 extending from the flange sized to receive the plunger 24 of the first member 20. The top of the container 34 has an orifice 32 and plug receiver 33 through which the fluid may pass. As shown in FIGS. 5 and 7, a third member 40 interacts with the second member 30 at the flange 36 and the plug receiver 33 at the top of the container 34 to collectively define a mold cavity 16 for molding a freezable substance. The third member 40 may be comprised of two separate members—a member that interacts with the second member 30 at the flange 36, and a fourth member that interacts with the plug receiver 33, or these third and fourth members may be integrally formed.

As described in detail below, the second and third members 30, 40 are disposed in the assembled configuration to collectively form the mold cavity 16 within which the freezable confection 12 may be poured, stored, and frozen. Further, the first, second, and third members 20, 30, 40 are disposed in the assembled configuration to collectively form the internal cavity 18 within which the fluid 14 may be poured, stored, and chilled. When the user desires to consume the frozen confection 12 and the fluid 14, the third member 40 is twisted and removed from the second member 30 to expose the frozen confection 12 and to access to the fluid 14, yielding the consumable product 11 shown in FIG. 1.

With reference now to FIGS. 1 and 8, it is contemplated that the internal cavity 18 may be pre-filled with a fluid 14 and the mold cavity 16 may be pre-filled with a freezable confection 12 at a manufacturing facility. The device 10 may be transported and stocked at room temperature for an extended shelf life. After the device 10 is purchased by the vendor or consumer, the device 10 may be chilled prior to consumption to freeze the confection 12 and to chill the fluid 14.

As shown in FIG. 3, the first member 20 includes a handle 22 with a plunger 24 disposed at one end. The first member 20 functions like the plunger of a syringe. The plunger 24 defines a cylindrical shape. In preferred embodiments, the handle 22 also defines a cylindrical shape, wherein the circumference of the handle 22 is approximately equivalent to the circumference of the plunger, as depicted in FIG. 3. Such a design is advantageous because it prevents the first member 20 from slipping when inserted into the second member 30, thereby preventing the plunger 24 from becoming disengaged from the inner wall of the container 34, which would result in fluid 14 leaking out of the container 34.

Figure 4:
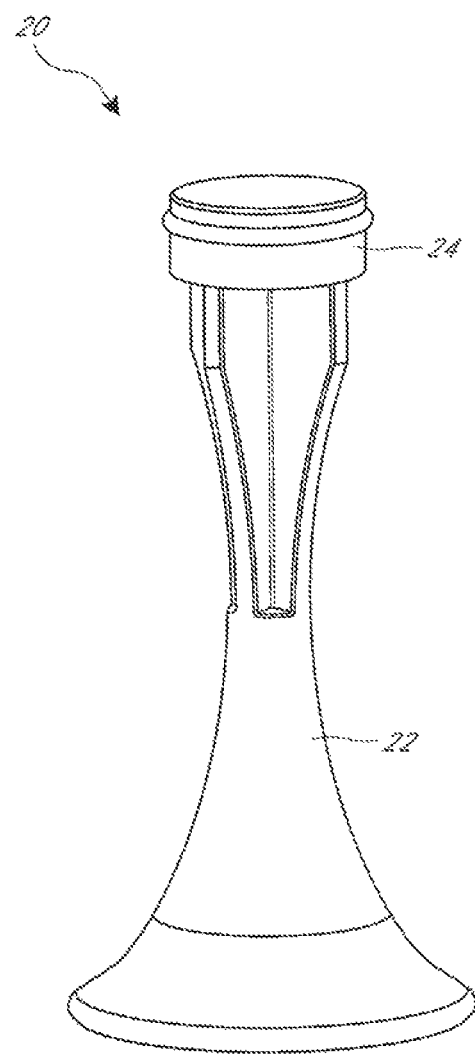
FIG. 4 depicts a side view of another exemplary first member, in accordance with exemplary embodiments of the invention.

In an alternative embodiment, as depicted in FIG. 4, the handle 22 defines a generally cylindrical shape where the circumference of the cylinder is smaller in the center of the handle 22 and gradually increases toward both ends of the handle. Furthermore, the handle 22 defines an ergonomic configuration with indents which are complimentary to a user's hand. The handle 22 is configured to facilitate clutching or gripping of the device by the user. As such, the handle 22 extends downward from the second member 30 shown in FIG. 5 to define a length that is suitable to enable a user to grip or clutch the device via the handle 22. The shape of the handle 22 is exemplary in nature only, and those skilled in the art will appreciate that other configurations may be used without departing from the spirit and scope of the present invention.

The plunger member 24 is configured to be removably inserted within the container 34 of the second member 30, as shown in FIG. 5. The second member 30 functions like the barrel of a syringe. In this regard, the container 34 includes an inner wall sized to receive the plunger 24 and handle 22. Furthermore, the plunger 24 and handle 22 may define an outer wall that is complimentary in size and shape to the inner wall of the container 34 to enable insertion of the plunger 24 and handle 22 through the container 34.

The plunger cap 24 may be formed of any material commonly used in syringes (i.e., rubber). The plunger material must have properties that allow the plunger to slide easily along the inner wall of the container 34, and that provide a sufficiently secure engagement so as to contain the fluid within the container 34.

A hollowed-out portion of the inner wall of the container 34, sized to receive and capture the plunger 24, forms a ring extending radially outward from the inner wall of the container. If the user attempts to pull the first member 20 out of the second member 30 when the device 10 is fully assembled, the hollowed-out portion captures the plunger 24 because the plunger expands upon entering the hollowed-out portion. Thus, the hollowed-out portion prevents the plunger 24 from being easily or inadvertently removed from the container 34, thereby resulting in fewer spillages of the fluid 14. In alternative embodiments, a ring extends radially inward from the inner wall of the container, also preventing the plunger 24 from being easily or inadvertently removed from the container 34.

As shown in FIG. 5, the container 34 receives the plunger 24 at one end thereof and has an orifice 32 at the generally opposite end thereof, the orifice 32 having a circumference smaller than that of the container 34. The orifice 32 may be directly opposite the side of the container receiving the plunger, or it may be located toward the end of the container not receiving the plunger. The orifice should be positioned such that at least half of the volume of the container is displaced before the plunger is adjacent to the orifice. Alternatively, the orifice should be positioned such that at least 75% of the volume of the container is displaced before the plunger is adjacent to the orifice. Alternatively, the orifice should be positioned such that at least 90% of the volume of the container is displaced before the plunger is adjacent to the orifice. Preferably, the orifice should be positioned such that all of the volume of the container is displaced before the plunger is adjacent to the orifice. The container 34 extends from the orifice 32 in a first direction and a plug receiver 33 extends from the orifice 32 in an opposing second direction. The internal cavity 18 depicted in FIG. 8 is collectively defined by the container 34, the plunger 24, and a solid cylindrical shaft 42 that plugs into the orifice 32 of the container 34 through the plug receiver 33. A plug receiver is advantageous because it provides a better seal between the second and third members, because it allows for easier assembly, and because it prevents pooling of the fluid 14 on top of the container when the device is used and thereby prevents unwanted melting of the frozen substance.

As shown in FIG. 8, the volume of the internal cavity 18 correlates to the amount of fluid capable of being dispensed by the device. In preferred embodiments, the internal cavity 18 defines a volume of 25 ml. In other embodiments, the internal cavity 18 defines a volume of at least 100 ml. In others embodiments, the internal cavity 18 may define a volume ranging from 1 ml to 25 ml. In others embodiments, the internal cavity 18 may define a volume ranging from 25 ml to 50 ml. In others embodiments, the internal cavity 18 may define a volume ranging from 50 ml to 75 ml. In others embodiments, the internal cavity 18 may define a volume ranging from 75 ml to 100 ml.

In preferred embodiments, the mold cavity 16 defines a volume of 75 ml. In other embodiments, the mold cavity 16 defines a volume of at least 300 ml. In other embodiments, the mold cavity 16 may define a volume ranging from 25 ml to 75 ml. In other embodiments, the mold cavity 16 may define a volume ranging from 75 ml to 125 ml. In other embodiments, the mold cavity 16 may define a volume ranging from 125 ml to 175 ml. In other embodiments, the mold cavity 16 may define a volume ranging from 175 ml to 300 ml.

Figure 9:
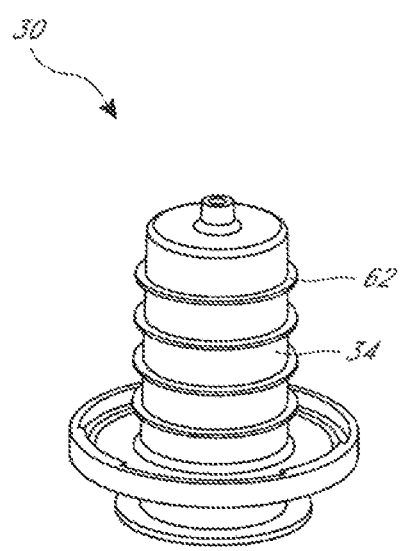
FIG. 9 depicts a side view of another exemplary second member with rings to prevent the frozen confection from slipping, in accordance with exemplary embodiments of the invention.

In preferred embodiments, the outer surface of the container 34 may define an irregular, or roughened surface for mitigating inadvertent sliding of the confection 12 along the container 34. Alternatively, as shown in FIG. 5, the outer surface of the container 34 is smooth. A smooth outer surface can be advantageous because it enables the container to be easily removed from a mold during the manufacturing process. FIG. 9 shows a container 34 having series of rings 62 disposed in spaced relation to each other along the length of the container 34. The rings 62 extend radially outward into the frozen confection to mitigate inadvertent sliding of the confection along the container 34. Although rings 62 are shown in FIG. 9, it is contemplated that the outer surface of the container 34 may be roughened to mitigate sliding of the confection along the container 34. Another embodiment of the container 34 may have a plurality of nodules disposed on the outer surface of the container 34 to mitigate inadvertent sliding of the confection 12 along the container 34. The nodules may be semi-spherical and may be evenly spaced along the container 34. Those skilled in the art will appreciate that the nodules may define other shapes, and may be irregularly spaced along the container 34.

Figure 2:
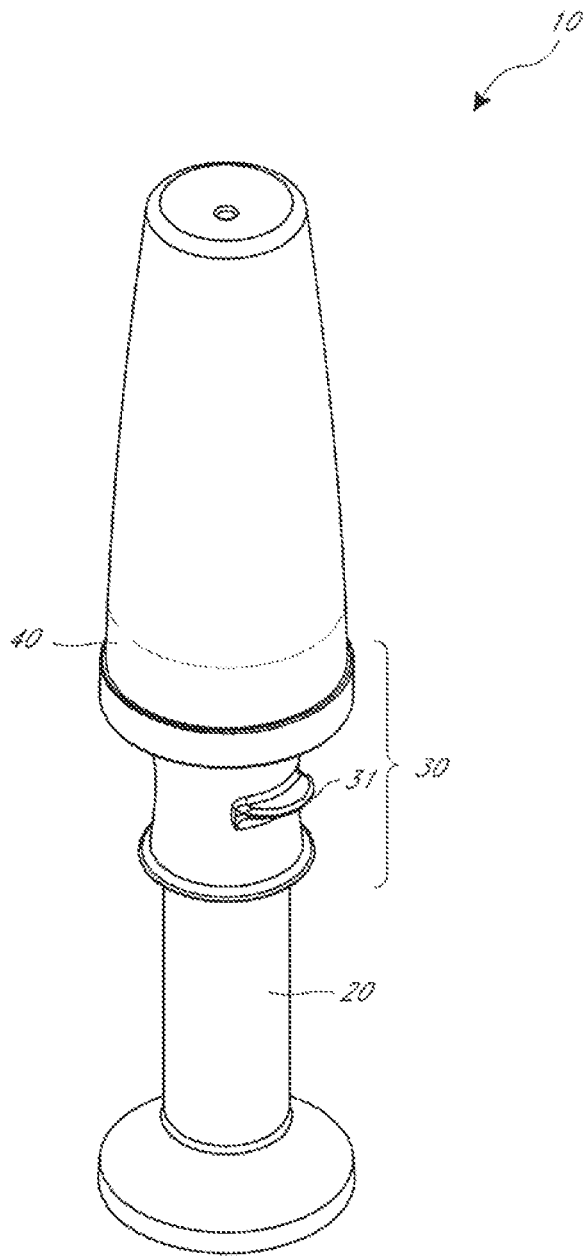
FIG. 2 depicts a top perspective side view of an exemplary device fully assembled, in accordance with exemplary embodiments of the invention.
Figure 10:
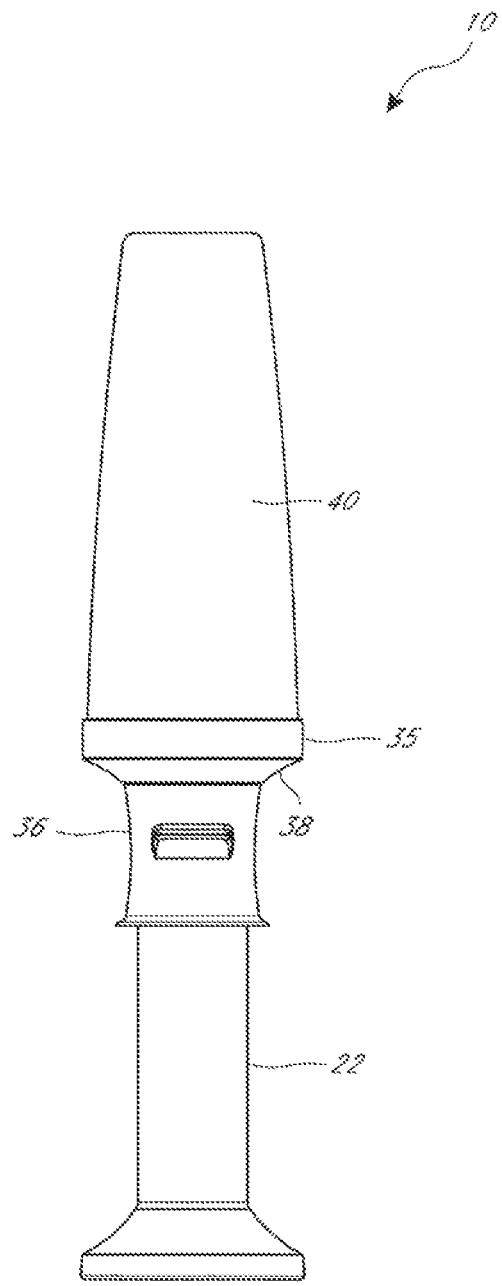
FIG. 10 depicts a side view of an exemplary device fully assembled, in accordance with exemplary embodiments of the invention.

The second member 30, as shown in FIG. 5, includes a flange 36 integrally formed to a container. Referring now to FIGS. 2 and 10, when the first member 20 is inserted into the second member 30 in the assembled configuration, the container 34 extends from the flange 36 in a first direction and the first member 20 extends from the flange 36 in an opposing second direction. The flange 36 defines a circular disc shape having an outer diameter that is larger than that of the handle 22 and the container 34.

In some embodiments, a cylindrical ring 38 extends radially outward from the flange 36 to define a radial edge. The cylindrical ring 38 circumnavigates the container 34. The cylindrical ring 38 is configured to engage with the third member 40, as described in detail below. The container is concentrically disposed relative to the third member when the third member is connected to the second member.

The flange 36 may include an outer edge 37 circumnavigating the cylindrical ring 38 and extending from the cylindrical ring adjacent the radial edge. The outer edge 37 and the cylinder ring 38 collectively define a drip guard useful for catching the frozen confection 12 as it melts. Alternatively, the flange 36 may include an outer edge 35 circumnavigating the cylindrical ring 38 that flares radially outward. This embodiment is advantageous if the user desires to drink the melted remains of the frozen confection 12 from the drip guard.

Some embodiments of the flange 36 may be configured to allow a user to easily and securely hold the second member 30 stationary while driving the first member upward through the container 34 so as to displace the fluid from the container through the lumen and into a person's mouth. In preferred embodiments, as shown in FIG. 2, a tab 31 extends radially outward from the outer wall of the flange, sized such that a user can place a finger on the tab 31 to prevent the second member 20 from moving while the user presses the first member 20 upward. In other embodiments, such as that depicted in FIG. 6, the flange 36 may include a grip ring 39 circumnavigating the flange and extending radially outward from the flange to define a second radial edge. The user may then hold the flange 36 in the indented portion between the grip ring 39 and the cylindrical ring 38.

As shown in FIG. 5, the flange 36 defines a flange length between the two ends of the flange's shaft. In some embodiments, the flange length measures between ¼ inch and ¾ inch. In other embodiments, the flange length measures between ¾ inch and 1¼ inches. In other embodiments, the flange length measures between 1¼ inches and 2 inches.

As shown in FIG. 7, the third member 40 has an enclosed end 44 and an opposing open end 46. The third member 40 is hollow to define an opening extending axially from the open end 46 to the closed end 44. In the embodiment depicted in FIG. 7, the third member 40 defines a tubular cross-section in a direction perpendicular to its longitudinal axis, wherein the third member 40 is tapered such that the diameter adjacent the enclosed end 44 is smaller than the diameter adjacent the opposing open end 46. Those skilled in the art will appreciate that the third member 40 may define a cross-section that is uniform along its length (i.e., not tapered), or other shapes (i.e., quadrangular, triangular, etc.) without departing from the spirit and scope of the present invention. As one example, the third member 40 may be a flared cylinder wherein the closed end diameter is 65% to 95% of the open end diameter.

The third member 40 defines a third member length from the open end 46 to the opposing enclosed end 44. The container 34 defines a container length from its end receiving the plug to the orifice 32, wherein the container length is less than the third member length. The container 34 may extend to various lengths. For example, the container length may extend between 10% and 25% of the third member length. Alternatively, the container length may extend between 25% and 50% of the third member length.

As shown in FIG. 8, disposed within the mold cavity 16 of the third member 40 is a shaft 42 extending from the center of the closed end 44 of the third member 40 toward the open end 46 of the third member. The shaft interacts with the second member. The shaft 42 is configured to be removably inserted through the plug receiver 33 and the orifice 32, such that the shaft extends partially into the container 34. In this regard, the orifice 32 and the plug receiver 33 have inner walls sized to receive the shaft 42. Furthermore, the shaft 42 may define an outer wall that is complimentary in size and shape to the inner walls of the orifice 32 and the plug receiver 33 to enable insertion of the shaft 42 through the orifice 32. In preferred embodiments, the shaft 42 is solid and has a generally cylindrical shape, with a circumference that decreases gradually towards the open end of the third member 30, such that the solid shaft 42 snuggly fits into the plug receiver 33 and forms a barrier between the fluid and the frozen substance.

In preferred embodiments, the solid shaft 42 extends partially into the internal cavity 18. Such an embodiment is advantageous in the event that the frozen substance inadvertently enters the plug receiver 33 or the internal cavity 18, where the extension of the solid shaft 42 into the internal cavity 18 prevents a blockage of the lumen 15 when the device 10 is frozen.

Figure 6:
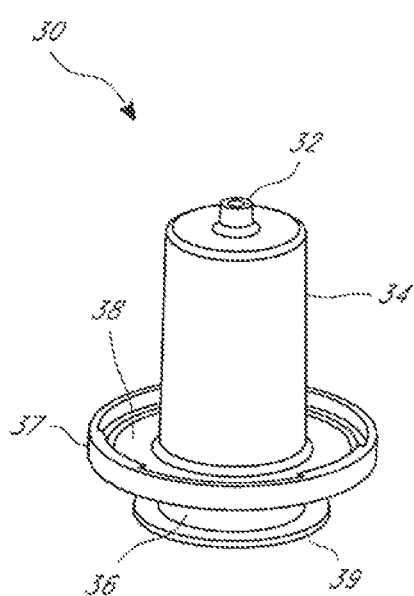
FIG. 6 depicts a side view of another exemplary second member, in accordance with exemplary embodiments of the invention.

In alternative embodiments as depicted by FIG. 6, there may be no plug receiver. Also, the solid shaft 42 may be cylindrical. Along these lines, the solid shaft 42 of the third member 40 and the orifice 34 of the second member 30 may be configured to cooperatively engage via press-fit/frictional engagement to secure the solid cylindrical shaft 42 to the second member 30. The engagement is secure enough to contain the fluid within the container 34.

With reference to FIGS. 2 and 8, the third member 40 interacts with the second member 30 to collectively define the mold cavity 16. More specifically, the mold cavity 16 is defined by the inner wall of the third member 40, the outer wall of the container 34, the cylindrical ring 38 (shown in FIG. 5), and the solid shaft 42. Before the device 10 is assembled, a first substance, such as a freezable confection, is poured or otherwise disposed within the mold cavity 16 to mold the first substance therein. Referring now to FIG. 1, after the device 10 is assembled and frozen, the third member 40 is removed from the second member 30, and a lumen 15 remains where the solid shaft 42 existed. It is contemplated that the third member 40 may have more than one shaft extending from its closed end to plug more than one orifice 32, such that when the user removes the third member 40, multiple lumens remain. The solid shaft 42 of the third member bears an advantage over prior art including a straw-like structure extending from a reservoir upward through a frozen substance—here, a lumen 15 replaces the straw-like structure, and the user is able to consume the frozen substance without having the straw-like structure inhibit the licking or sucking of the frozen substance as the frozen substance dissipates.

The second and third members 30, 40 interact with each other when the device is assembled. The second and third members 30, 40 may include structural features to facilitate engagement between the second member 30 and the third member 40. In the embodiment depicted in FIGS. 2 and 5, the third member 40 engages with the cylindrical ring 38 and the outer edge 37 when the third member 40 is coupled to the second member 30. Along these lines, the open end 46 of the third member 40 and the outer edge 37 of the second member 30 may be configured to cooperatively engage via a screw cap engagement to secure the third member 40 to the second member 30. Alternatively, the open end 46 of the third member 40 and the cylindrical ring 38 of the second member 30 may be configured to cooperatively engage via press-fit/frictional engagement to secure the third member 40 to the second member 30. An o-ring formed of a soft plastic may be disposed on the upward-facing side of the cylindrical ring 38, allowing for a more secure engagement between the second member 30 and the third member 40. The engagement is secure enough to contain the freezable confection within the mold cavity 16 when the confection is in liquid form.

Although the foregoing describes a cylindrical ring 38 to facilitate engagement between the second and third members 30, 40, it is contemplated that other engagement techniques may also be employed. For instance, the flange 36 may define a groove into which the open end 46 of the third member 40 may be inserted to engage the second member 30 to the third member 40.

In some embodiments, the second member 30 is formed from a unitary body, as shown in FIG. 5. In other words, the flange 36 and container 34 comprise a single unit. Other embodiments may include a second member 30 formed from a plurality of elements. More specifically, the second member 30 may include a container 34 that is configured to be removably inserted within the flange 36 to define a nested configuration. In this regard, the flange 36 includes an inner wall sized to receive the container 34. Furthermore, the container 34 may define an outer wall that is complimentary in shape and size to the inner wall of the flange 36 to enable insertion and nesting of the container 34 within the flange 36. The detachable configuration of the container 34 and flange 36 may advantageously allow for refilling of the container 34 with the fluid during use of the device 10. In other words, the container 34 and first member 20 may be removed from the flange 36 to refill the internal cavity 18 through the orifice 32 at a location spaced from the flange 36 to mitigate inadvertent spilling of the fluid 14 onto the confection 12 during the refilling process.

The first, second, and third members 20, 30, 40, are preferably formed of a material that can withstand the freezing temperatures that are necessary to freeze the freezable confection. Furthermore, the first, second, and third members are preferably formed of a material that can withstand any expansion or contraction of the confection as it is frozen or heated. Along these lines, it may be preferable to not completely fill the mold cavity 16 with the freezable confection to allow for expansion of the confection during the freezing process.

In some embodiments, LED lights may be incorporated into either the first member 20 or the second member 30. LED lights are advantageous because they allow the user to light up the device 10 when using the device in a dark setting, such as the outdoors at night or indoors in a dimly lit nightclub or restaurant.

Assembly of the device 10 entails the following steps. First, the freezable confection 12 is disposed within the mold cavity 16 through the open end 46 of the third member 40. It is contemplated that the freezable confection 12 may include fruit juices, alcoholic mixers, flavored water, or other freezable confections known in the art. Furthermore, although the majority of the alcoholic beverage is disposed within the container 34, a small amount of the alcoholic beverage may also be mixed with the freezable confection 12, so long as the alcohol does not prevent the confection 12 from freezing (i.e., a small amount of an alcoholic beverage may not prevent the confection 12 from freezing).

Second, the second member 30 is secured to the third member 40, such that the freezable liquid is contained in the mold cavity 16 in a spill-proof manner. Third, the fluid 14 is disposed within the container 34. The fluid 14 may be vodka, rum, tequila, or other alcoholic beverages, as well as non-alcoholic beverages. The fluid 14 also may be any fluid edible product that is not a beverage, such as syrup, sauce, spherical sugar candies, and the like. Fourth, the plunger 24 of the first member 20 is inserted into the container 34, such that the fluid 14 is contained in the internal cavity 18 in a spill-proof manner. The device 10 is then placed within a freezer to freeze the confection 12 and chill the fluid 14.

To consume the confection 12 and the fluid 14, the device 10 is removed from the freezer and the third member 40 is twisted and removed from engagement with the second member 30 to expose the frozen confection 12, as shown in FIG. 1. To consume the frozen confection 12, the user may lick on the frozen confection as he would lick a Popsicle®. To consume the fluid 14, the user may push the first member 20 upward while holding the second member 30 stationary, displacing the fluid 14 from the internal cavity 18 into the lumen 15 within the frozen confection 12 and then into the user's mouth while the user simultaneously sucks on the frozen confection 12. Alternatively, the user may ingest the fluid 14 without pushing upward on the first member 20 by sucking on the frozen confection 12, thereby creating a pressure drop that forces the fluid 14 through the lumen 15 and into a user's mouth. If the user wishes to refrain from ingesting any fluid 14 at all, the user may not push the first member 20 upward. If the user wishes to ingest the fluid 14, the user may push the first member 20 upward quickly, thereby shooting the fluid from the device. Alternatively, the user may push the first member 20 upward slowly, thereby drizzling the fluid over the frozen confection. As such, the device 10 allows the user to simultaneously enjoy the frozen confection 12 and the fluid 14.

The first, second, and third members 20, 30, 40, are preferably formed of a material that is sufficiently durable to allow for washing and reuse (e.g. food-grade polypropylene or other suitable food-grade plastic). Thus, the device 10 may be sold for single use or for multiple uses.

What is claimed is:

1. A device for molding a freezable substance and dispensing a stored fluid substance, the device comprising:
   a first member including:
      a handle;
      a plunger disposed at one end of the handle;
   a second member including:
      a flange;
      a container extending from the flange and receiving the plunger at a first end of the container, the container defining an inner volume to receive and store a fluid substance, and having an orifice disposed generally opposite of the first end of the container; and
   a third member including:
      a hollow, generally tubular mold with an open end to receive a freezable substance and a closed end on an opposite side of the mold from the open end, the open end of the third member interacting with the flange of the second member; and
      a shaft extending from the closed end of the mold toward the open end of the mold, the shaft interacting with the orifice of the second member,
   wherein the open end of the third member interacts with the flange of the second member to collectively define a mold cavity for holding a freezable substance with the shaft extending through the mold cavity to the orifice, and wherein when the third member is removed from the second member, a lumen is formed from the orifice to an exterior of a frozen substance to permit passage of the fluid substance through the orifice, through the lumen, and to the exterior of the frozen substance.

2. The device according to claim 1, wherein the shaft is integrally formed with the hollow tubular mold.

3. The device according to claim 1, wherein the container is concentrically disposed relative to the third member when the third member interacts with the second member.

4. The device according to claim 1, wherein the flange second member includes a circular ring extending radially outward from the flange to define an outer edge.

5. The device according to claim 4, wherein the third member defines a shape that interacts with the outer edge to cooperatively engage the outer edge when the third member interacts with the second member.

6. The device according to claim 1, wherein the container defines a volume of approximately 1 ml to approximately 25 ml.

7. The device according to claim 1, wherein the shaft extends through the orifice and partially into the container when the device is assembled.

8. The device according to claim 2, wherein the shaft extends through the orifice and partially into the container when the device is assembled.

9. A device for molding a freezable substance with at least one lumen in the frozen substance through which a fluid substance may pass, the device comprising:
   a first member including a handle and a plunger disposed at one end of the handle;
   a second member including:
      a container defining an inner volume to receive a fluid substance, the container having a first end configured to receive the plunger and an orifice disposed apart from first end, and
      a flange extending about the container; and a third member including:
- a hollow, generally tubular mold with an open end to receive a freezable substance and a closed end on an opposite side of the mold from the open end; and
- a shaft extending from the closed end of the mold toward the open end of the mold, and at least partially into the orifice;

and wherein when the third member is removed from the second member, a lumen is formed from the orifice to an exterior of a frozen substance to permit passage of the fluid substance through the orifice, through the lumen, and to the exterior of frozen substance.

10. The device according to claim 9, wherein the hollow, generally tubular mold is a flared cylinder wherein the closed end diameter is 65% to 95% of the open end diameter.

11. The device according to claim 9, wherein the shaft is a solid shaft.

12. The device according to claim 9, wherein the shaft is integrally formed with the hollow tubular mold.

13. The device according to claim 11, wherein the solid shaft, the container, and the plunger are concentrically disposed along a common axis.

14. The device according to claim 4 additionally comprising an O-ring disposed between the flange of the second member and the open end of the third member.

15. The device according to claim 14, wherein the O-ring is disposed on an upward-facing side surface of the circular ring.

16. The device according to claim 1 additionally comprising an O-ring disposed between the flange of the second member and the open end of the third member.

17. The device according to claim 9 additionally comprising an O-ring disposed between the flange of the second member and the open end of the third member.

18. The device according to claim 1, wherein the container includes an outer surface having at least one ring that extends outwardly into the frozen substance.

19. The device according to claim 9, wherein the container includes an outer surface having at least one ring that extends outwardly into the frozen substance.

20. The device according to claim 9, wherein the orifice is disposed on an end of the container opposite of the first end.

* * * * *